US 6,655,116 B2

(12) United States Patent
Cullen

(10) Patent No.: US 6,655,116 B2
(45) Date of Patent: Dec. 2, 2003

(54) ADJUSTABLE PNEUMATIC DENSITY CONTROL MEANS FOR AN AGRICULTURAL BAGGING MACHINE

(76) Inventor: Steven R. Cullen, Box 747, Astoria, OR (US) 97103

( * ) Notice: Subject to any disclaimer, the term of this patent is extended or adjusted under 35 U.S.C. 154(b) by 0 days.

(21) Appl. No.: 09/927,951

(22) Filed: Aug. 10, 2001

(65) Prior Publication Data

US 2003/0154690 A1 Aug. 21, 2003

(51) Int. Cl.⁷ .............................................. B65B 1/24
(52) U.S. Cl. .......................... 53/527; 53/567; 53/576
(58) Field of Search ........................ 53/527, 529, 567, 53/576; 100/2 V; 141/73, 317

(56) References Cited

U.S. PATENT DOCUMENTS

| | | | |
|---|---|---|---|
| 3,687,061 A | 8/1972 | Eggenmuller et al. | 100/65 |
| 4,046,068 A | 9/1977 | Eggenmüller et al. | 100/65 |
| 4,337,805 A | 7/1982 | Johnson et al. | 141/71 |
| 4,621,666 A | 11/1986 | Ryan | 141/114 |
| 5,297,377 A | 3/1994 | Cullen | 53/527 |
| 5,425,220 A | 6/1995 | Cullen | 53/527 |
| 5,464,049 A * | 11/1995 | Cullen | 53/527 |
| 5,671,594 A | 9/1997 | Cullen | 53/567 |
| 5,857,313 A * | 1/1999 | Cullen | 53/567 |
| 5,899,247 A | 5/1999 | Cullen | 141/313 |
| 5,960,612 A * | 10/1999 | Cullen | 53/576 |
| 6,000,323 A * | 12/1999 | Schlegel | 100/211 |
| 6,202,389 B1 * | 3/2001 | Inman et al. | 53/567 |
| 6,430,897 B1 * | 8/2002 | Cameron et al. | 53/576 |
| 6,443,194 B1 * | 9/2002 | Cullen | 53/527 |

* cited by examiner

Primary Examiner—John Sipos
(74) Attorney, Agent, or Firm—Thomte, Mazour & Niebergall; Dennis L. Thomte

(57) ABSTRACT

An adjustable pneumatic density control is provided for an agricultural bagging machine which not only acts as an anchor against premature movement of the machine as the bag is being filled, but also controls the density of the material being packed in an agricultural bag. The adjustable pneumatic density control comprises an inflatable bladder which is supported upon the rearward end of a flexible cable extending from the frame of the bagging machine. An air line extends to the bladder to supply air to the interior thereof to enable the size of the bladder to be selectively varied. A density control gauge or meter is imposed in the air line to enable the operator to ascertain and control the pressure within the bladder. An optional shield is also provided which extends partially around the bladder to reduce wear on the bladder and to prevent damage to the bladder.

11 Claims, 4 Drawing Sheets

ADJUSTABLE PNEUMATIC DENSITY CONTROL MEANS FOR AN AGRICULTURAL BAGGING MACHINE

BACKGROUND OF THE INVENTION

1. Field of the Invention

This invention relates to an agricultural bagging machine and more particularly to an adjustable pneumatic density control means for an agricultural bagging machine. This invention further includes an internal density meter or gauge which is associated with the adjustable pneumatic density control means for indicating the density of the material within the bag. The invention additionally includes an optional shield which partially extends around the adjustable pneumatic density control means for reducing wear on the same and for preventing damage to the same.

2. Description of the Related Art

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's U.S. Pat. No. 5,297,377, a bagging machine is described which has the capability of enabling the density of the silage material to be selectively controlled without the need of an elaborate braking system. In applicant's U.S. Pat. No. 5,297,377, a density control means is described which included a plurality of cables which are positioned in the flow of the silage material being bagged. In order to vary the density of the material in the machine of the '377 patent, more or less cables are employed based on the material being packed. For example, corn silage flows easy and would require more cables while alfalfa packs hard and would use less cables.

In applicant's U.S. Pat. No. 5,425,220, a density control means is described which includes a pair of intersecting cables positioned in the flow of the silage material being bagged. In order to vary the density of the material in the machine of the '220 patent, the relationship of the intersecting or crisscrossing cables is varied. In applicant's U.S. Pat. No. 5,671,594, a fixed beveled press plate is disclosed for use with a density control cable.

Although the use of the density control cables in applicant's previous patents such as U.S. Pat. No. 5,671,594 has met with success, the adjustment of the cable loop takes approximately ten feet of machine movement before the adjusted cable loop becomes completely effective.

In applicant's U.S. Pat. No. 5,899,247, an adjustable anchor wing was provided for an agricultural bagging machine with the anchor wing being positioned in the material being bagged to vary the density of the material being bagged. Although applicant's previous density control means has met with considerable success, it is believed that the instant invention is an improvement thereover.

SUMMARY OF THE INVENTION

An agricultural feed bagging machine is disclosed which comprises a wheeled frame having rearward and forward ends. A tunnel is provided on the wheeled frame and has an intake end for receiving silage material or the like and an output end adapted to receive the mouth of an agricultural bag. A hopper or feed table is provided on the wheeled frame for receiving the material to be bagged and is adapted to supply the same to a feed compression means such as a rotatable rotor which forces the material into the tunnel and into the bag. A support in the form of a flexible cable or the like is secured to the frame means and extends rearwardly from the tunnel of the bagging machine. An inflatable bladder-like material engaging member is secured to the rearward end of the flexible cable so that the bladder-like material engaging member is in engagement with the material being bagged to resist the movement of the bagging machine away from the bagged material, thereby controlling the density of the bagged material. The bladder-like material engaging member is selectively inflatable to vary the size thereof. An air line extends from a source of air under pressure on the wheeled frame to the bladder-like material engaging member for selectively inflating and deflating the same. An air gauge or density meter is in operative communication with the air line for indicating the pressure within the material engaging member, thereby providing an indication to the operator as to the density of the material within the bag.

An optional shield partially extends around the material engaging member for reducing wear on the material engaging member and for preventing damage to the same in the event that there happens to be sharp objects within the material being bagged.

It is therefore a principal object of the invention to provide an adjustable pneumatic density control means for an agricultural bagging machine.

A further object of the invention is to provide an adjustable pneumatic density control means for an agricultural bagging machine including an internal density meter or gauge.

Still another object of the invention is to provide an adjustable pneumatic density control means for an agricultural bagging machine which enables the density of the packed material to be precisely controlled.

Still another object of the invention is to provide an adjustable pneumatic density control means for an agricultural bagging machine wherein the density control means acts as an anchor in the material being bagged to prevent the bagging machine from rolling ahead prematurely.

Yet another object of the invention is to provide an adjustable pneumatic density control means which may be mounted on a conventional agricultural bagging machine without extensive modifications thereof.

Still another object of the invention is to provide an adjustable pneumatic density control means for an agricultural bagging machine and an internal density meter associated therewith which is economical of manufacture and durable in use.

Still another object of the invention is to provide a shield for the adjustable pneumatic density control means to reduce wear and to prevent damage to the same.

These and other objects of the invention will be apparent to those skilled in the art.

DESCRIPTION OF THE PREFERRED EMBODIMENT

Figure 1:
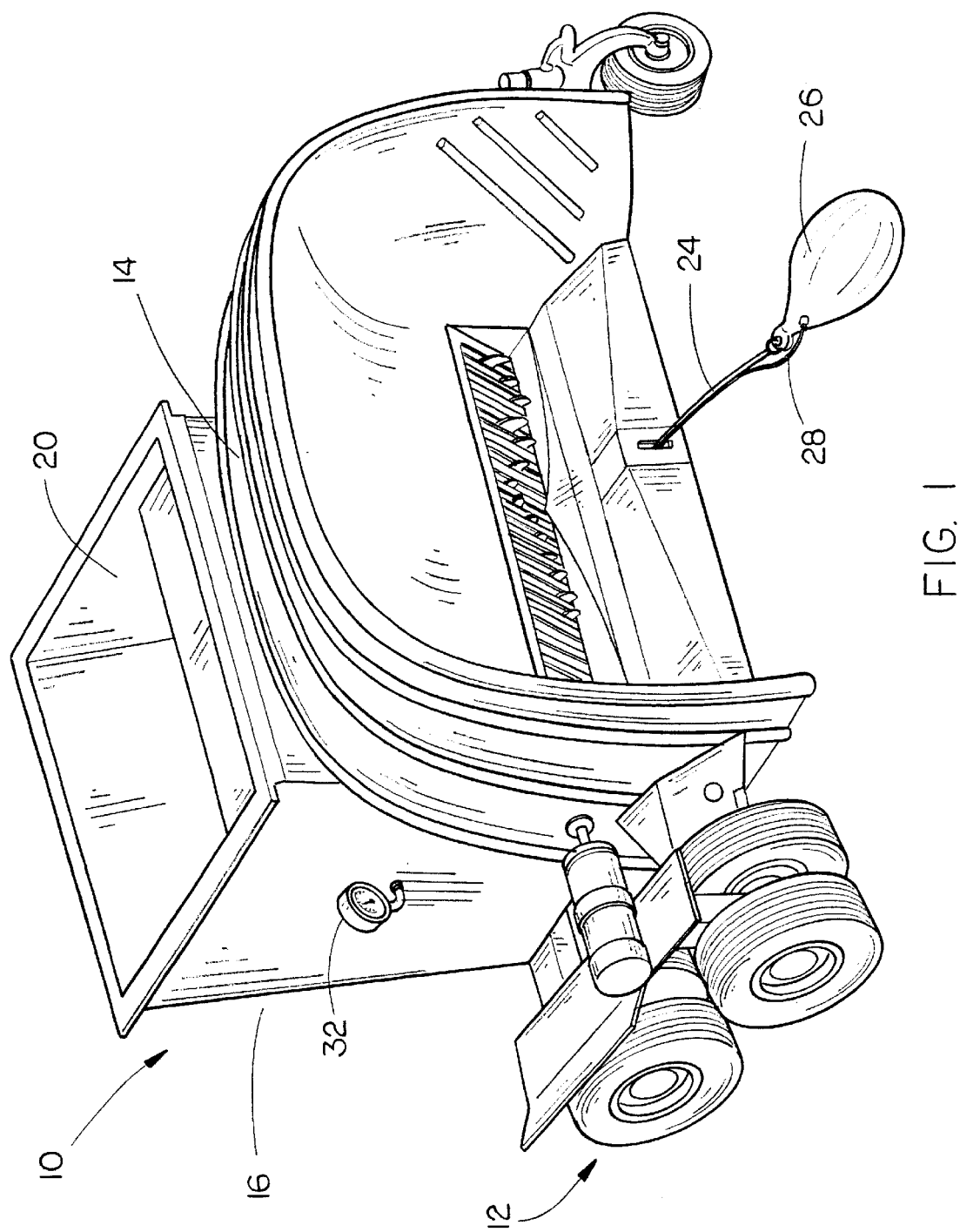
FIG. 1 is a rear perspective view of an agricultural bagging machine having the adjustable pneumatic density control means of this invention associated therewith.
Figure 2:
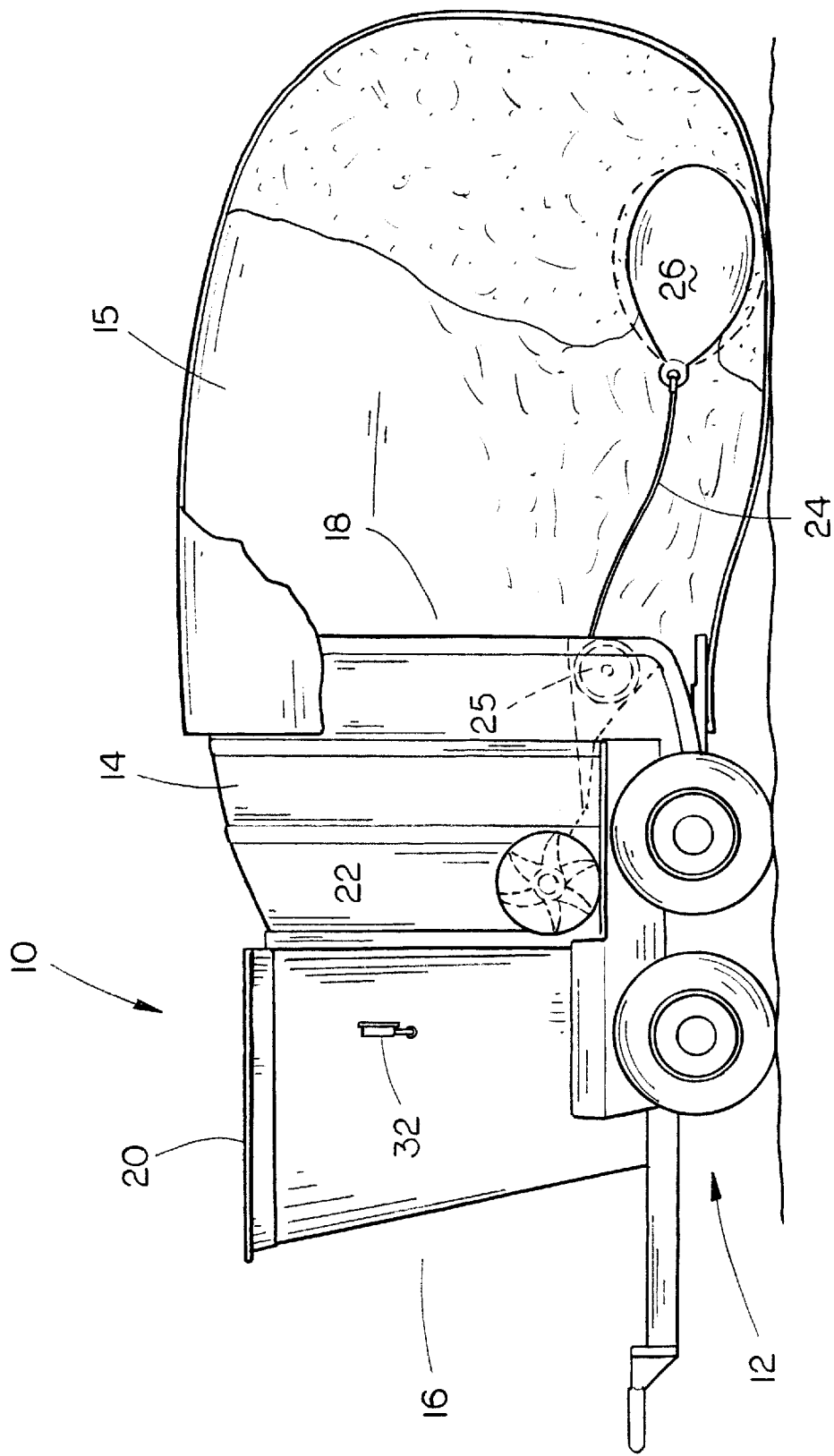
FIG. 2 is a side elevational view of the machine of FIG. 1 with a portion of the agricultural bag cut away to more fully illustrate the invention.
Figure 3:
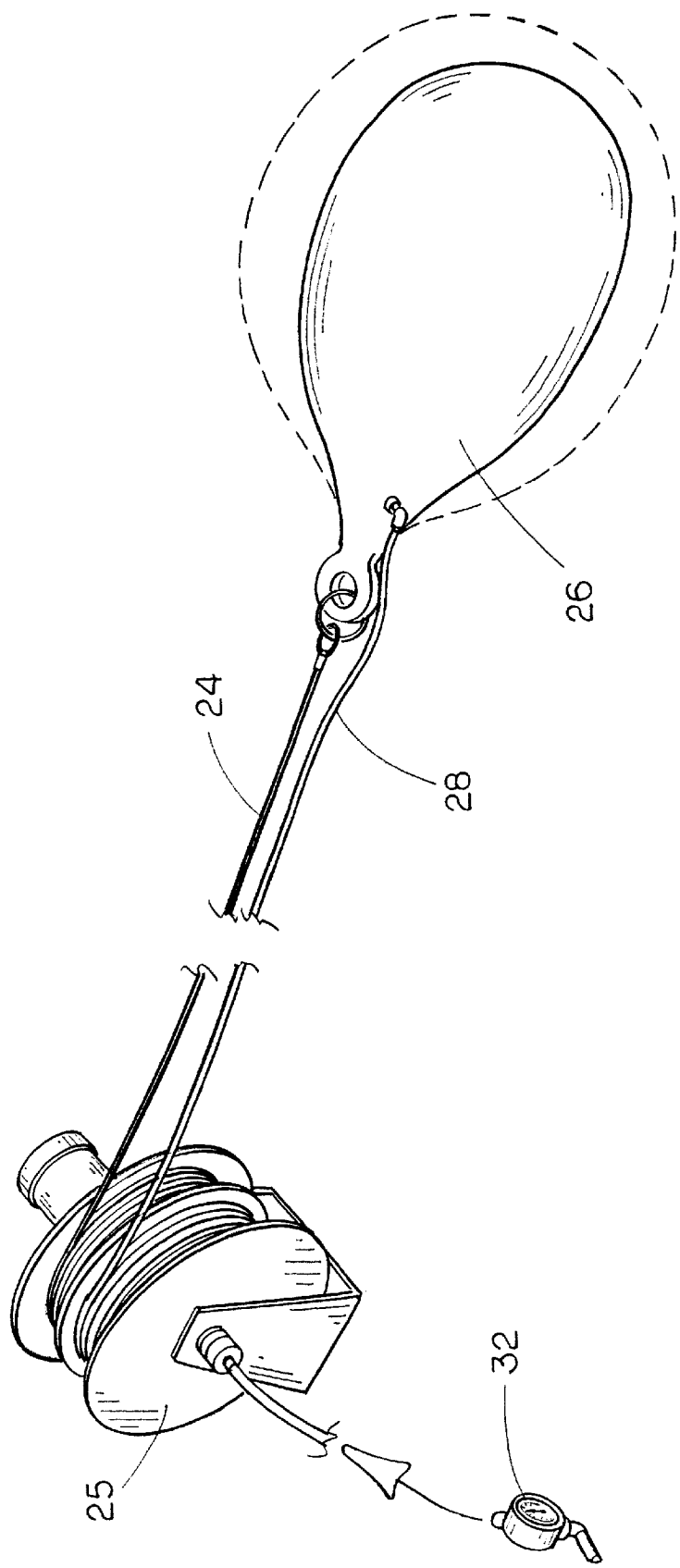
FIG. 3 is a perspective view of the density control means of this invention.

The numeral 10 refers generally to an agricultural bagging machine such as disclosed in U.S. Pat. No. 5,671,594. Machine 10 includes a wheeled frame 12 having a tunnel 14 mounted thereon upon which is normally positioned the open mouth of a conventional agricultural bag 15. Although the preferred embodiment includes a wheeled frame, a non-wheeled frame could also be employed. For purposes of conciseness, the power means for driving the various components of the machine will not be disclosed, since the same does not form a part of the invention. The power means could be an engine mounted on the machine or it could be a power takeoff (PTO) shaft connected to a tractor PTO.

For purposes of description, the bagging machine 10 will be described as including a forward end 16 and a rearward end 18. Bagging machine 10 includes a hopper means 20 or other material receiving means, such as a feed table, conveyors or the like, at the forward end thereof which is adapted to receive the material to be bagged from a truck, wagon, etc. A horizontally disposed rotatable rotor 22 of conventional design is located at the lower end of the hopper means 20 for forcing the material to be bagged into the tunnel 14 and into the bag 15 in conventional fashion. Although a horizontally disposed rotor is disclosed, it is possible that other types of material compression or compaction means could be employed such as augers, packers, etc.

The numeral 24 refers to an elongated flexible cable, support or the like which is secured to the wheeled frame 12, preferably in the tunnel 14, and which extends rearwardly therefrom, as seen in the drawings, so that the rearward end of the cable 24 is positioned within the material in the bag. The cable 24 may be mounted upon a reel 25 if so desired. However, the forward end of cable 24 will normally be secured to the frame 12 by a clevis or the like. A selectively inflatable bladder-like material engaging member or bladder 26 is secured to the rearward end of cable 24. The size of the bladder 26 is selectively varied by controlling the amount of air pressure within the bladder 26. As air pressure increases within the bladder 26, the size or diameter of the same will also increase and vice versa. Air line 28 has its rearward end in communication with the bladder 26 for supplying air thereto and has its forward end in operative communication with a source of air under pressure. Air line 28 may also be wound upon the reel 25 if so desired. A gauge or density meter 32 is imposed in the air line 28 to enable the operator to determine the amount of air pressure within the bladder 26 which will indicate to the operator the density of the material within the bag in the area of the bladder 26. The air line 28, having the gauge 32 imposed therein, enables the operator to precisely control the density of the material within the bag. Further, the gauge or density meter 32 also enables successive bags to be packed so as to have the same density in each of the bags. For example, if the operator fills a bag wherein the air pressure within bladder 26 is 40 PSI, the operator will pack successive bags with 40 PSI in the bladder 26 which will ensure that the bags will have the same density.

The bladder size (diameter) is set by filling it with air. The ultimate size is set based on the particular material/feed conditions, i.e., alfalfa or corn silage, whether dry, long cut or short cut. When the bagging process is in motion, the resulting pressure from the surrounding packing material/feed squeezes around the bladder 26 causing the air pressure reading at the operator's panel to change, thereby providing an internal density meter in which to gauge how tight or dense the material is being packed within the bag. The tighter the material, the higher the PSI reading on the gauge 32. To measure the real pressure in the actual mass of material is a great improvement for the operator, since the operator can now fill bags properly in any condition and have a measurement so that the process can be repeated over and over again with the same approximate density.

At the finished end of the bag, the operator simply opens the air valve in the air line 28 which causes the bladder 26 to collapse so as to be thin and small. This allows the machine to pull the air bladder from the end of the finished bag without dragging or disturbing the packed material/feed in the process.

The bladder 26 acts as an anchor similar to that described in U.S. Pat. No. 5,899,247. Bladder 26 is positioned in the material so that there is sufficient weight of the mass of material/feed to hold the bagging machine from rolling ahead prematurely before the desired density of material/feed is achieved in the bag. When the bladder 26 is inflated, the larger the size becomes the tighter the material becomes.

Conversely, the smaller the bladder, the less dense the material becomes.

Figure 4:
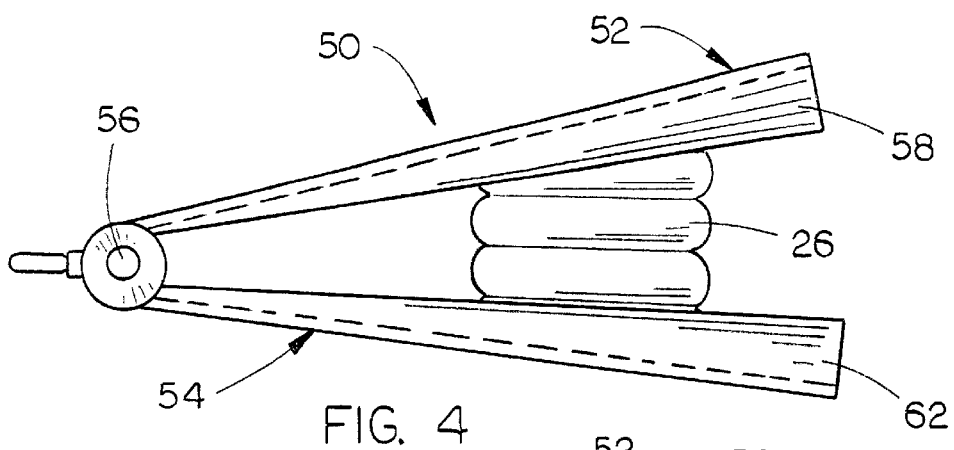
FIG. 4 is a side elevational view of a shield which is optionally used with the bladder.
Figure 5:
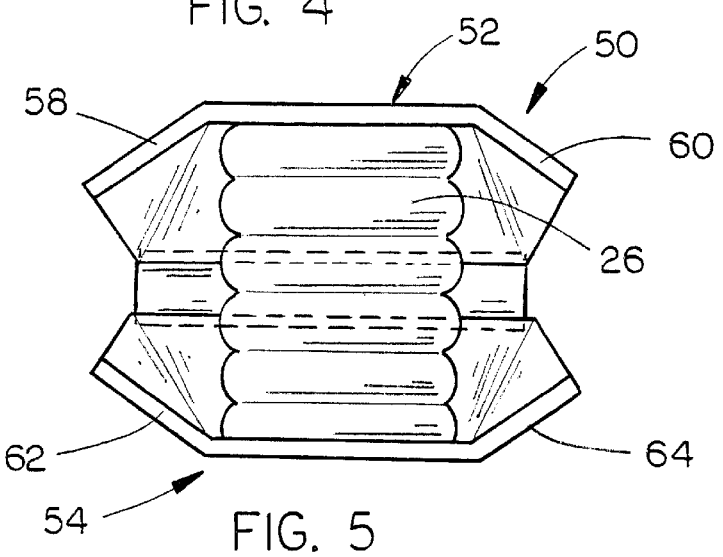
FIG. 5 is a rear view of the bladder shield.
Figure 6:
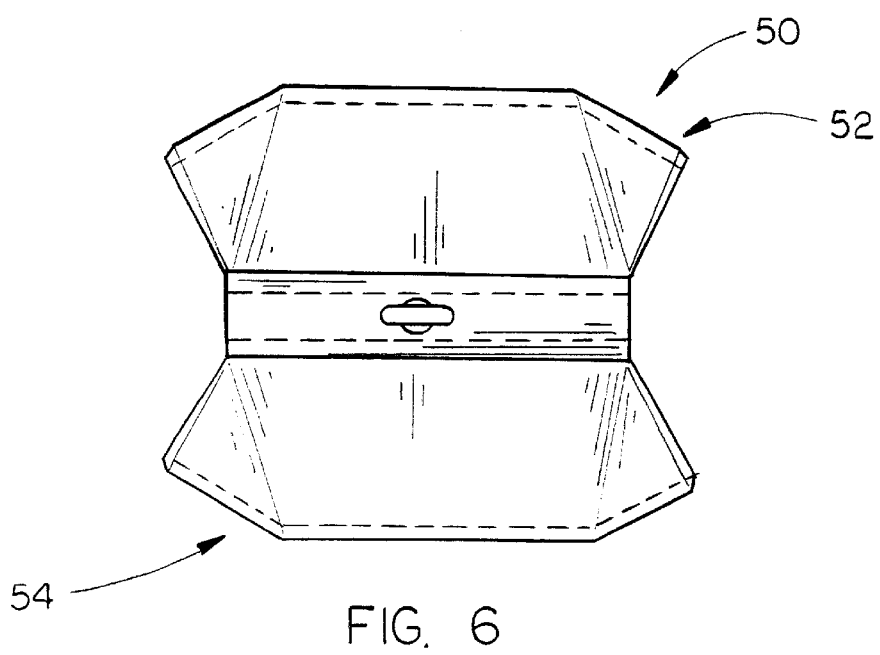
FIG. 6 is a front view of the bladder shield.

In some cases, it is desirable to provide a bladder shield which partially extends around the bladder to prevent damage to the bladder should the bladder encounter a sharp object in the material being bagged. The optional bladder shield also reduces the wear on the bladder. The bladder shield of this invention is illustrated in FIGS. 4–6 and is referred to generally by the reference numeral 50. The bladder shield 50 must have a symmetrical shape to achieve neutral lateral movement of the same as it passes through the material being bagged. Bladder shield 50 includes an upper shield member 52 and a lower shield member 54 hingedly connected at the forward ends thereof at 56. The upper and lower shields 52 and 54 partially extend around the bladder 26 to shield the bladder from sharp objects in the material being bagged and to prevent wear on the bladder. As seen in FIG. 5, upper shield 52 has downwardly and outwardly extending sides 58 and 60 while shield 54 has upwardly and outwardly extending sides 62 and 64. The members 58, 60, 62, and 64 provide a symmetrical shape to the shield 50 so that movement of the shield through the feed is such that lateral movement of the same is reduced.

Thus it can be seen that a novel adjustable pneumatic density control means has been provided for an agricultural bagging machine. It can also be seen that a novel internal density meter has been provided for an agricultural bagging machine.

It can therefore be seen that the invention accomplishes at least all of its stated objectives.

I claim:

1. A bagging machine for bagging material into bags having a closed end and an open mouth, comprising:

a wheeled frame having rearward and forward ends;

a tunnel on said wheeled frame having an intake end for receiving the material to be bagged and an output end adapted to receive the open mouth of the bag;

said tunnel having opposite sides;

a material receiving means on said wheeled frame forwardly of said tunnel for receiving the material to be bagged;

a material packing means on said wheeled frame at the intake end of said tunnel for forcing the material to be bagged from said material receiving means into said tunnel and into said bag;

and a density control assembly positioned rearwardly of the intake end of said tunnel;

said density control assembly comprising a support which is operatively secured to said frame means and an inflatable bladder-like material engaging member supported by said support so that said bladder-like material engaging member is in engagement with the material being bagged to resist the movement of said bagging machine away from the bagged material, thereby controlling the density of the bagged material.

2. The bagging machine of claim 1 wherein said bladder-like material engaging member is selectively inflatable to selectively vary the size thereof.

3. The bagging machine of claim 2 wherein an air line extends to said bladder-like material engaging member for selectively inflating the same.

4. The bagging machine of claim 3 wherein an air gauge is operatively connected to said air line for indicating the air pressure within said bladder-like material engaging member.

5. The bagging machine of claim 3 wherein an indicator means is operatively connected to said air line for indicating the size of said bladder-like material engaging member.

6. The bagging machine of claim 3 further including a source of air pressure positioned on said wheeled frame which is connected to said air line.

7. The bagging machine of claim 1 wherein said support comprises a flexible member secured to said wheeled frame within said tunnel and which extends rearwardly therefrom, said bladder-like material engaging member being secured to the rearward end of said flexible member.

8. The bagging machine of claim 1 wherein a protective shield is positioned adjacent said bladder-like material engaging member.

9. The bagging machine of claim 8 wherein said protective shield extends at least partially around said bladder-like material engaging member.

10. The bagging machine of claim 9 wherein said protective shield comprises at least a pair of opposing shield members positioned on opposite sides of said bladder-like material engaging member.

11. The bagging machine of claim 10 wherein said shield members include means for preventing lateral movement of said protective shield.

\* \* \* \* \*